US011201734B2

United States Patent
Zheng et al.

(10) Patent No.: US 11,201,734 B2
(45) Date of Patent: Dec. 14, 2021

(54) METHOD AND SYSTEM FOR FAULT TOLERANT AND SECURE MULTIPARTY COMPUTATION WITH SPDZ

(71) Applicant: Robert Bosch GmbH, Stuttgart (DE)

(72) Inventors: Qingji Zheng, Pittsburgh, PA (US); Shalabh Jain, Pittsburgh, PA (US); Jorge Guajardo Merchan, Pittsburgh, PA (US); Sebastian Becker, Ludwigsburg (DE); Sven Trieflinger, Renningen (DE)

(73) Assignee: Robert Bosch GmbH, Stuttgart (DE)

( * ) Notice: Subject to any disclaimer, the term of this patent is extended or adjusted under 35 U.S.C. 154(b) by 292 days.

(21) Appl. No.: 16/263,285

(22) Filed: Jan. 31, 2019

(65) Prior Publication Data

US 2019/0372760 A1    Dec. 5, 2019

Related U.S. Application Data

(60) Provisional application No. 62/680,364, filed on Jun. 4, 2018.

(51) Int. Cl.
 *H04L 9/08* (2006.01)
 *G06F 7/523* (2006.01)
 *G06F 7/50* (2006.01)

(52) U.S. Cl.
 CPC ............ *H04L 9/085* (2013.01); *H04L 9/0894* (2013.01); *G06F 7/50* (2013.01); *G06F 7/523* (2013.01); *H04L 2209/46* (2013.01)

(58) Field of Classification Search
 CPC ... H04L 9/085; H04L 9/0894; H04L 2209/46; G06F 7/50; G06F 7/523

USPC .......................................................... 380/28
See application file for complete search history.

(56) References Cited

U.S. PATENT DOCUMENTS

| 9,077,539 | B2 | 7/2015 | Kamara et al. |
| 9,679,149 | B2 | 6/2017 | Chida et al. |
| 2016/0253515 | A1 | 9/2016 | Damgård et al. |

(Continued)

OTHER PUBLICATIONS

Damgard et al. Practical Covertly Secure MPC for Dishonest Majority—or: Breaking the SPDZ Limits. ESORICS 2013. Sep. 9-13, 2014; (Year: 2014).*

(Continued)

*Primary Examiner* — Kambiz Zand
*Assistant Examiner* — Phuc Pham
(74) *Attorney, Agent, or Firm* — Maginot, Moore & Beck LLP

(57) ABSTRACT

A method for implementing a secure multiparty computation protocol between a plurality of parties for a multiparty computation includes performing an offline phase of an SPDZ protocol for each of the parties participating in the multiparty computation. A secret share redistribution phase is then performed wherein the secret shares of the parties are redistributed to a subset of the parties. A secret share recombination phase is performed during which the subset of the parties recombines the redistributed secret shares to recover the secret shares of the parties not in the subset. An online phase of the SPDZ protocol is then performed during which the function is computed with respect to the private inputs of the parties and using the secret shares of all the parties.

14 Claims, 9 Drawing Sheets

(56) References Cited

U.S. PATENT DOCUMENTS

2018/0204284 A1 7/2018 Cerezo Sznchez
2018/0373834 A1* 12/2018 Cho ...................... G16B 20/00

OTHER PUBLICATIONS

Damgård, et al.; Practical Covertly Secure MPC for Dishonest Majority—or: Breaking the SPDZ Limits; ESORICS 2013; Sep. 9-13, 2014; pp. 1-18; Springer LNCS 8134.
Bristol Cryptography Blog—What is SPDZ? Part 1: MPC Circuit Evaluation Overview; Oct. 21, 2016; 3 Pages.
Bristol Cryptography Blog—What is SPDZ? Part 2: MPC Circuit Evaluation; Oct. 28, 2016; 3 Pages.
Bristol Cryptography Blog—What is SPDZ? Part 3: SPDZ specifics; Nov. 4, 2016; 3 pages.
Damgård, et al.; Multiparty Computation from Somewhat Homomorphic Encryption; CRYPTO 2012; Aug. 19-23, 2012; pp. 643-662.
Running SPDZ with fault tolerance?; SPDZ/SCALE—Mamba Discussion Group; Jan. 1-2; 2 Pages.
Keller et al.; Overdrive: Making SPDZ Great Again; 34 Page Article.

* cited by examiner for Each party $P_i$ holding the secret share $\alpha_i$, $1 \leq i \leq n$, do

Let $\Psi = \{P_1, \ldots, P_{i-1}, P_{i+1}, \ldots, P_n\}$ be the set consisting of all parties beyond itself, and $\Omega$ be the set of all subsets of $\Psi$, that have $t$ parties, for the subset $S = \{P_{k_1}, \ldots, P_{k_t}\} \in \Omega$, party $P_i$ do

Let Label be the string uniquely identifying $S$ (e.g., concatenating $t$ parties in order)

Select $\alpha_{i,k_1}$, Label, $\ldots$, $\alpha_{i,k_{t-1}}$, Label uniform at random, and let $\alpha_{i,k_t}$, Label be the value such that
$$\alpha_{i,k_1}, \text{Label} + \cdots + \alpha_{i,k_t}, \text{Label} = \alpha_i$$
Send $\alpha_{i,k_j}$, Label, $1 \leq j \leq t$, and Label to the party $P_{k_j}$, $k_j \in S$, via authenticated confidential channel end end for Each party Party $P_i$, $1 \leq i \leq n$ do

$P_i$ sums up the redistributed secret shares with respect to Label, denoted by $\text{AggSet}_i = \{(\text{Label}, \sum_{\text{Label}})\}$ where Label is the string uniquely identifying the subset, and $\sum_{\text{Label}}$ is the sum of the redistributed secret shares with respect to the label Label. Note that $P_i$ also holds the secret share $\alpha_i$.

end

Let $\overline{\text{Label}}$ be the string uniquely identifying the set of $t$ parties $\{P_i, \ldots, P_t\}$ for *Each party* $P_i$, $1 \leq i \leq t$ do

Let $\bar{\alpha}_i = \alpha_i + \sum_{\overline{\text{Label}}}$, where $\sum_{\overline{\text{Label}}}$ is the value, fetched from $\text{AggSet}_i$ according to $\overline{\text{Label}}$ end

| Party $P_1$ $x_1$ | Party $P_2$ $x_2$ | Party $P_3$ $x_3$ | Party $P_4$ $x_4$ |
|---|---|---|---|
|  | $(Label_{2,3} = \text{"2}\|\text{3"}, x_{1,2,Label_{2,3}})$ | $(Label_{2,3} = \text{"2}\|\text{3"}, x_{1,3,Label_{2,3}})$ |  |
|  | $(Label_{2,4} = \text{"2}\|\text{4"}, x_{1,2,Label_{2,3}})$ |  | $(Label_{2,4} = \text{"2}\|\text{4"}, x_{1,4,Label_{2,4}})$ |
|  |  | $(Label_{3,4} = \text{"3}\|\text{4"}, x_{1,3,Label_{3,4}})$ | $(Label_{3,4} = \text{"3}\|\text{4"}, x_{1,4,Label_{3,4}})$ |

FIG. 7

| Party $P_1$ $x_1$ | Party $P_2$ $x_2$ | Party $P_3$ $x_3$ | Party $P_4$ $x_4$ |
|---|---|---|---|
|  | $(Label_{2,3} = \text{"2}\|\text{3"}, x_{1,2,Label_{2,3}})$ $(Label_{2,4} = \text{"2}\|\text{4"}, x_{1,2,Label_{2,4}})$ | $(Label_{2,3} = \text{"2}\|\text{3"}, x_{1,3,Label_{2,3}})$ $(Label_{3,4} = \text{"3}\|\text{4"}, x_{1,3,Label_{3,4}})$ | $(Label_{2,4} = \text{"2}\|\text{4"}, x_{1,4,Label_{2,4}})$ $(Label_{3,4} = \text{"3}\|\text{4"}, x_{1,4,Label_{3,4}})$ |
| $(Label_{1,3} = \text{"1}\|\text{3"}, x_{2,1,Label_{1,3}})$ $(Label_{1,4} = \text{"1}\|\text{4"}, x_{2,1,Label_{1,4}})$ |  | $(Label_{1,3} = \text{"1}\|\text{3"}, x_{2,3,Label_{1,3}})$ $(Label_{3,4} = \text{"3}\|\text{4"}, x_{2,3,Label_{3,4}})$ | $(Label_{1,4} = \text{"1}\|\text{4"}, x_{2,4,Label_{1,4}})$ $(Label_{3,4} = \text{"3}\|\text{4"}, x_{2,4,Label_{3,4}})$ |
| $(Label_{1,2} = \text{"1}\|\text{2"}, x_{3,1,Label_{1,2}})$ $(Label_{1,4} = \text{"1}\|\text{4"}, x_{3,1,Label_{1,4}})$ | $(Label_{1,2} = \text{"1}\|\text{2"}, x_{3,2,Label_{1,2}})$ $(Label_{2,4} = \text{"2}\|\text{4"}, x_{3,2,Label_{2,4}})$ |  | $(Label_{1,4} = \text{"1}\|\text{4"}, x_{3,4,Label_{1,4}})$ $(Label_{2,4} = \text{"2}\|\text{4"}, x_{3,4,Label_{2,4}})$ |
| $(Label_{1,2} = \text{"1}\|\text{2"}, x_{4,1,Label_{1,2}})$ $(Label_{1,3} = \text{"1}\|\text{3"}, x_{4,1,Label_{1,3}})$ | $(Label_{1,2} = \text{"1}\|\text{2"}, x_{4,2,Label_{1,2}})$ $(Label_{2,3} = \text{"2}\|\text{3"}, x_{4,2,Label_{2,3}})$ | $(Label_{1,3} = \text{"1}\|\text{3"}, x_{4,3,Label_{1,3}})$ $(Label_{2,3} = \text{"2}\|\text{3"}, x_{4,3,Label_{2,3}})$ |  |

| Party | Holding Secret Share | Redistributed secret shares AggSet |
|---|---|---|
| Party $P_1$ | $x_1$ | $(\text{Label}_{1,2} = \text{"1}\|\text{2"}, x_{3,1,\text{Label}_{1,2}} + x_{4,1,\text{Label}_{1,2}})$<br>$(\text{Label}_{1,3} = \text{"1}\|\text{3"}, x_{2,1,\text{Label}_{1,3}} + x_{4,1,\text{Label}_{1,3}})$<br>$(\text{Label}_{1,4} = \text{"1}\|\text{4"}, x_{2,1,\text{Label}_{1,4}} + x_{3,1,\text{Label}_{1,2}})$ |
| Party $P_2$ | $x_2$ | $(\text{Label}_{1,2} = \text{"1}\|\text{2"}, x_{3,2,\text{Label}_{1,2}} + x_{4,2,\text{Label}_{1,2}})$<br>$(\text{Label}_{2,3} = \text{"2}\|\text{3"}, x_{1,2,\text{Label}_{2,3}} + x_{4,2,\text{Label}_{2,3}})$<br>$(\text{Label}_{1,2} = \text{"1}\|\text{2"}, x_{1,2,\text{Label}_{2,4}} + x_{3,2,\text{Label}_{2,4}})$ |
| Party $P_3$ | $x_3$ | $(\text{Label}_{1,3} = \text{"1}\|\text{3"}, x_{2,3,\text{Label}_{1,3}} + x_{4,3,\text{Label}_{1,3}})$<br>$(\text{Label}_{2,3} = \text{"2}\|\text{3"}, x_{1,3,\text{Label}_{2,3}} + x_{4,3,\text{Label}_{2,3}})$<br>$(\text{Label}_{3,4} = \text{"3}\|\text{4"}, x_{1,3,\text{Label}_{3,4}} + x_{4,3,\text{Label}_{3,4}})$ |
| Party $P_4$ | $x_4$ | $(\text{Label}_{1,4} = \text{"1}\|\text{4"}, x_{2,4,\text{Label}_{1,4}} + x_{3,4,\text{Label}_{1,4}})$<br>$(\text{Label}_{2,4} = \text{"2}\|\text{4"}, x_{1,4,\text{Label}_{2,4}} + x_{3,4,\text{Label}_{2,4}})$<br>$(\text{Label}_{3,4} = \text{"3}\|\text{4"}, x_{1,4,\text{Label}_{3,4}} + x_{2,4,\text{Label}_{3,4}})$ |

FIG. 8

Execute Protocol ReShare($\lambda_1, \ldots, \lambda_n, P_1, \ldots, P_n, t$), where $\lambda_i$ is the secret share of MAC key $\lambda$.

for *each tuple generated in the offline phase* do for *each element in the tuple:*$[x] = \{(x_1, \gamma_1(x)), \ldots, (x_n, \gamma_n(x))\}$ do

Execute Protocol ReShare($x_1, \ldots, x_n, P_1, \ldots, P_n, t$), where $x_i, 1 \leq i \leq n$ is the secret share of data value $x$.

Execute Protocol ReShare($\gamma_1(x), \ldots, \gamma_n(x), P_1, \ldots, P_n, t$), where $\gamma_i(x), 1 \leq i \leq n$ is the secret share of MAC value $x\lambda$.

end end

FIG. 9

Execute Protocol ReCombine($\lambda_1$, AggSet$_1, \ldots, \lambda_t$, AggSet$_t, P_1, \ldots, P_t$), so that party $P_i$ obtains the secret share of MAC key $\lambda$.

for *each tuple generated in the offline phase* do for *each element in the tuple and each party $P_i$ holds* ($x_i$, AggSet$_i, \ldots, \gamma_i(x)$, AggSet$_{\gamma_i}$) do

Execute Protocol ReCombine($x_1$, AggSet$_1, \ldots, x_t$, AggSet$_t, P_1, \ldots, P_t$), so that party $P_i$ obtains the secret share of data value $x$.

where $x_i, 1 \leq i \leq n$ is the secret share of data value $x$.

Execute Protocol ReCombine($\gamma_1(x)$, AggSet$_{\gamma_1}, \ldots, \gamma_t(x)$, AggSet$_{\gamma_t}, P_1, \ldots P_t$), so that party $P_i$ obtains the secret share of MAC value $x\lambda$.

Execute Protocol ReCombine ($\gamma_1(x), \ldots, \gamma_n(x), P_1, \ldots, P_n, t$), where $\gamma_i(x), 1 \leq i \leq n$ is the secret share of MAC value $x\lambda$.

end

FIG. 10

| | SPDZ | Fault Tolerant SPDZ |
|---|---|---|
| Storage Consumption | 1 | $\binom{n-1}{t}+1$ |
| Number of Malicious Parties | $n-1$ | $t-1$ |
| Fault Tolerance | 0 | $n-t$ |

METHOD AND SYSTEM FOR FAULT TOLERANT AND SECURE MULTIPARTY COMPUTATION WITH SPDZ

CROSS-REFERENCE TO RELATED APPLICATIONS

This application claims priority to U.S. Provisional Application Ser. No. 62/680,364 entitled "METHOD AND SYSTEM FOR FAULT TOLERANT AND SECURE MULTI-PARTY COMPUTATION WITH SPDZ" by Zheng et al., filed Jun. 4, 2018, the disclosure of which is hereby incorporated herein by reference in its entirety.

TECHNICAL FIELD

This disclosure relates generally to multiparty computation (MPC) protocols, and, in particular, to the SPDZ (pronounced "speedz") MPC protocol.

BACKGROUND

In a secure multiparty computation (MPC) protocol, a number of parties jointly compute a function on their private inputs and learn only the output of the function. The SPDZ protocol is one of the most practical and actively secure MPC protocols and achieves the security against any number of malicious corrupted parties. To be specific, the SPDZ protocol is working in the preprocessing model: Without knowing any future inputs, the offline phase executes the time-consuming tasks to generate tuples; and the online phase executes the specific functions with the private inputs, as well as leveraging those tuples from the offline phase. In particular, SPDZ is a general-purpose MPC protocol allowing joint computation of arithmetic circuits.

While the SPDZ protocol offers great benefits in terms of security and performance, it does not support any fault tolerance at all: it requires all parties in the offline phase to be present in the online phase. This might become problematic from the distributed system point of view, as one or more parties might become unavailable after the offline phase. To resolve this, the straightforward approach is to re-execute the offline phase, which, however, is not promising as it wastes all generated tuples (as well as private input shares in the case of SPDZ as a service, see section 3.4).

What is needed is a fault tolerant SPDZ protocol that enables secure multiparty computations even when some parties become unavailable during the online phase.

BRIEF DESCRIPTION OF THE DRAWINGS

FIG. 4 depicts the algorithm for a protocol ReShare for fault tolerant SPDZ in accordance with the present disclosure.

FIG. 5 depicts the algorithm for a protocol ReCombine for fault tolerant SPDZ.

FIG. 6 depicts a table of the intermediate results after a party redistributes its holding secret share to other parties.

FIG. 7 depicts a table showing the final results after each party redistributes their secret shares to the other parties.

FIG. 8 depicts a table showing the final result after executing protocol ReShare.

FIG. 9 depicts the algorithm for the secret share redistribution phase which is based on the protocol ReShare.

FIG. 10 depicts the algorithm for the secret share redistribution phase which is based on the protocol ReCombine.

DETAILED DESCRIPTION

Figure 1:
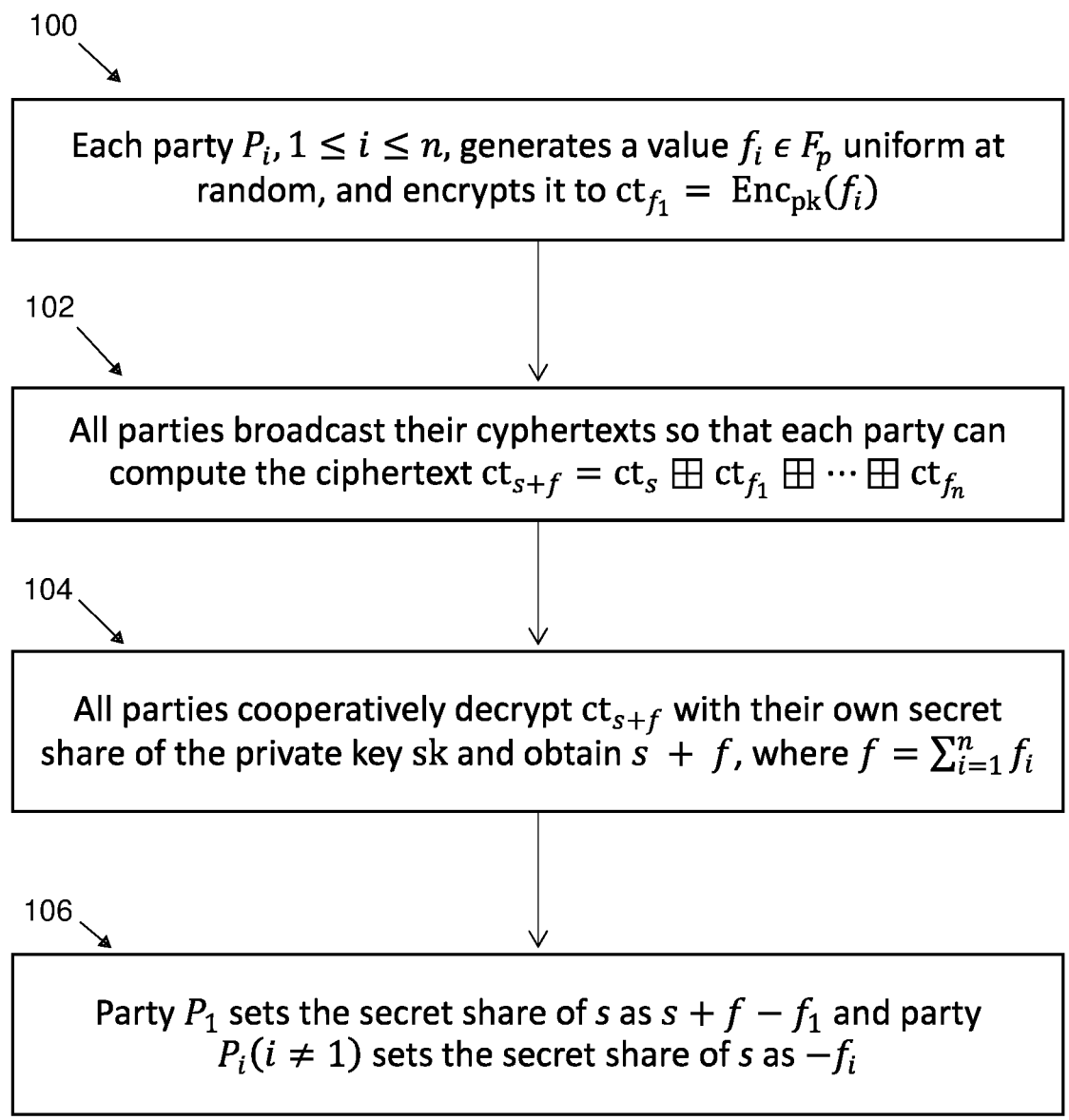
FIG. 1 depicts the steps of the SPDZ Protocol Share($ct_s$, $P_1, \ldots, P_n$) where $ct_s = Enc_{pk}(s)$ is publicly known and $P_1, \ldots, P_n$ are n parties.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to a person of ordinary skill in the art to which this disclosure pertains.

This disclosure is directed to solving the problem of fault tolerance for the SPDZ protocol. One goal of this disclosure is to assure that the SPDZ protocol is able to operate correctly after some parties become unavailable in the online phase. As described below, a ReShare protocol is proposed in which each party's holding secret share (with respect to a secret value) is redistributed to other parties, and a ReCombine protocol is proposed in which the redistributed secret shares are recombined according to the available parties. Based on the two protocols, a secret share redistribution phase and a secret share recombination phase are disclosed which can be put between the offline and online phase in the SPDZ protocol. The extended SPDZ protocol provides the promising fault tolerance feature, assuring that even when some parties become unavailable after the offline phase, the remaining parties can continue to perform the online phase correctly.

As used herein, the term "Beaver triple" refers to a set of three values (a, b, c) in which a and b are selected uniformly at random and c is equal to the product of a multiplied by b: c=ab. All three numbers in the Beaver triple are members of a finite field $F_p$ where p is a modulo value. In some illustrative embodiments where $p=2^n-1$, the finite field $F_p$ includes all integers in a range of $[-2^{n/2}, 2^{n/2}-1]$ where n is 64, 80, or 128, although other finite fields can be used. As described in further detail below, in a modified SPDZ protocol the parties generate Beaver triples during an offline computation phase and distribute shares of the Beaver triples in a secure manner for later use as part of an online computation phase for multi-party computation of inner products.

As used herein, the terms "homomorphism" and "homomorphic" refer to a property of some cryptographic systems in which mathematical operations can be applied to encrypted values to produce an encrypted result that matches the result of performing the same operations to the plaintext values without revealing the contents of the encrypted values or the result to the computing device that performs the operation. For example, given two values a=1 and b=2 and their corresponding encrypted counterparts a' and b', in a cryptographic system that provides additive homomorphism the encrypted value c'=a'+b' stores an encrypted representation of the number "3" (1+2=3). The value c' can be computed by a computer that cannot determine the plaintext values of a' or b' and, in some instances, the computer that produces c' can decrypt c' to retrieve the plaintext sum (3) without the ability to determine the original plaintext values of a or b. Subtractive homomorphism similarly applies to an operation that subtracts two encrypted values (e.g. a=2, b=1, c'=a'−b', decryption (c')=1), and in the embodiments described herein subtractive homomorphism is also equivalent to additive homomorphism in which one or more selected values are negated to perform an addition operation that is equivalent to subtraction. Similarly, a cryptographic system that provides multiplicative homomorphism the product of two encrypted values (a' and b') is another encrypted value (c') that decrypts to the same value as the product of the two plaintext values (a and b) (e.g. a=2, b=3, c'=(a'b'), decryption (c')=6). In the embodiments described herein, the ⊞ notation refers to an addition between two encrypted values in a cryptographic system that provides additive homomorphism, the ⊟ refers to a subtraction operation between two encrypted values in a cryptographic system that provides subtractive homomorphism, where subtraction can be considered as addition of a negated value, and the ⊠ notation similarly refers to a multiplication between two encrypted values in a cryptographic system that provides multiplicative homomorphism.

As used herein, the term $\lambda$ refers to a message authentication code (MAC) cryptographic key that is selected from the finite field $F_p$ ($\lambda \in F_p$). Each of the parties $P_i$, $1 \leq i \leq n$, that perform the inner product operation are provided with an individual share $\lambda_i$ of the overall secret $\lambda$ where $\lambda$ is the sum of all the individual secrets ($\lambda = \lambda_1 + \ldots + \lambda_n$). None of the parties has access to the full MAC cryptographic key $\lambda$. The MAC cryptographic key $\lambda$ can generate an encrypted MAC value that corresponds to a message authentication code for a value x via multiplication $\lambda x$, and as described below the MAC key $\lambda$ can itself be encrypted using a public key to generate an encrypted ciphertext of the MAC key $ct_\lambda$ that can be shared amongst multiple parties. The encrypted MAC value is used for verification of information received from other parties and to provide resistance against malicious parties that alter shared data during multiparty computation operations. Some embodiments that are described herein may omit the use of the MAC key $\lambda$ in configurations of multiparty computation systems that preserve privacy of the origin input data but that trust the participants to provide accurate data outputs during multiparty computations.

As used herein, the term $\varepsilon$=(Enc, Dec) refers to an asymmetric public key encryption system that provides at least additive/subtractive and multiplicative homomorphism with threshold decryption. The term sk refers to the private key in $\varepsilon$ that is used for decryption of ciphertext with the Dec function and the term pk refers to the public key in $\varepsilon$ that is used for the encryption of plaintext to produce ciphertext using the Enc function. Each of the parties $P_i$, $1 \leq i \leq n$ that performs the multiparty inner product computation has access to the full public key pk and a portion of the private key $sk_i$ where $sk = sk_1 + \ldots + sk_n$ where none of the parties has access to the full private key sk.

As used herein, the notation [ ] for a value (e.g. [x]) indicates a "share" of the value or where multiple parties each hold a share [x] of the overall value x, but having access to a share [x] does not reveal the actual value of x. In the embodiments described below, the value x is an encrypted ciphertext value, and the additive homomorphic properties of the cryptographic systems used herein enable the total value x to be divided into individual shares that have a total value of x. In the computation of inner products from two vectors that have multiple elements, each element of a vector represents a value that is shared amongst two or more nodes in a secure manner. Mathematically, $[x] = \{(x_1, \gamma_1(x)), \ldots, (x_n, \gamma_n(x))\}$ for a total of n parties $P_i$, $1 \leq i \leq n$ where each share $[x_i]$ is a portion of the total [x] where $x = x_1 + x_2 \ldots + x_n$, the term $\gamma_i(x)$ for each party is another individual share of the value $H_x$, which is the output of the cryptographic key $\lambda$ multiplied by the value x ($H_x = \lambda x$), and given the individual shares $\gamma_i(x)$, the total is $H_x = \gamma_1(x) + \gamma_2(x) + \ldots + \gamma_n(x)$. Each party stores a share value [x] as one of the tuples $(x_i, \gamma_i(x))$, and does not reveal this tuple to other parties in the group directly.

The SPDZ protocol uses a two-phase approach that includes an "offline" phase of computations that multiple parties use for the secure exchange of randomly generated numbers known as Beaver triples with each other. The Beaver triples are not the actual data of interest to the nodes, but are used in the subsequent online phase to enable computation of shared results while preventing each party from identifying the private data from one or more additional parties. The offline phase introduces computations to compute and share the Beaver triples that includes encryption operations, and is generally considered to be the more computationally intensive phase of the SPDZ protocol. In a second "online" phase the parties use the Beaver triples and the actual data of interest to perform secure multiparty computations, including the inner product computation that is described above. While the SPDZ protocol is effective at performing inner product computations, the large number of multiplication operations that occur in the inner product computation during the online phase introduces additional communication operations that each requires the use of Beaver triples and produces computational overhead between the parties due to the underlying operations that SPDZ implements for multiparty multiplications.

Before the offline and online phases, cryptographic keys must be generated, including public cryptographic parameters, public key, private key shares (possessed by each party) and MAC key shares (possessed by each party) are generated. In particular, each party receives one of n MAC key shares where n is the total number of parties. Suppose that $\lambda$ is the MAC key and $\lambda_1 + \ldots + \lambda_n$ are secret (MAC) shares, then party $P_i$, $1 \leq i \leq n$, possesses the secret share $\lambda_i$. Note that this step is executed only once unless the MAC key needs to be updated.

During the offline phase of the SPDZ protocol, a sufficient number of multiplication triples, in particular Beaver multiplication triples, are generated which will allow the parties to compute products. The Beaver multiplication triples consist of three values ([a], [b], [c]) which are shares of a, b, c, respectively, where a, b, c $\in F_p$ are random values and c=ab. These values can be generated by the crypto provider, and the resulting shares distributed to the parties before the online phase.

Given a ciphertext $ct_s = Enc_{pk}(s)$ for some value s, SPDZ protocol Share can securely distribute the secret share of s, as shown in FIG. 1. Protocol Share($ct_s$, $P_1$, ..., $P_n$) where $ct_s = Enc_{pk}(s)$ is publicly known and $P_1$, ..., $P_n$ are n parties.

Referring to FIG. 1, each party generates a value a value $f_i \in F_p$ uniform at random, and encrypts it to a ciphertext $ct_{f_i} = Enc_{pk}(f_i)$ (Block 100). All parties then broadcast their ciphertexts so that each party can compute the ciphertext $ct_{s+f} = ct_s \boxplus ct_{f_1} \boxplus \ldots \boxplus ct_{f_n}$. (Block 102). All parties then cooperatively decrypt $ct_{s+f}$ with their own secret share of the private key sk and obtain s+f, where $f = \tau_{i=1}^n f_i$ (Block 104). Party $P_1$ sets the secret share of s as $s+f-f_1$ and party $P_i(i \neq 1)$ sets the secret share of s as $-f_i$ (Block 106).

With the protocol Share, let $ct_\lambda = Enc_{pk}(\lambda)$ be the ciphertext of the MAC key $\lambda$, then the process of generating the triple ([a], [b], [c]) is performed. The following steps may be used to generate [a]:

Party $P_i$, chooses a value $a_i \in F_p$ uniform at random, and encrypts it to $ct_{a_i} = Enc_{pk}(a_i)$ One selected party computes $ct_a = ct_{a_i} \boxplus \ldots \boxplus ct_{a_n}$, as well as $ct_{\lambda, a} = ct_\lambda \boxtimes ct_a$.

All parties together execute Share($ct_{\lambda, a}$, $P_1$, ..., $P_n$), such that party $P_i$, $1 \leq i \leq n$, holds a secret share $\gamma_i(a)$ of $\lambda a$. Therefore, Party i holds $(a_i, \gamma_i(a))$ where $a = a_1 + \ldots + a_n$ and $\lambda \times a = \gamma_1(a) + \ldots + \gamma_n(a)$.

The same steps used to generate [a] are repeated to generate [b]. The value [c] is generated such that c=ab. Given $ct_a$ and $ct_b$ from steps 1 and 2, let $ct_c = ct_a \boxtimes ct_b$. The protocol Share($ct_c$, $P_1$, ..., $P_n$) is executed, so that Party i holds the secret share $c_i$ of c. Given c+f when executing a protocol Share on $ct_c$, a fresh ciphertext $ct'_c = Enc_{pk}(c+f) \boxminus ct_{f_1} \boxminus \ldots \boxminus ct_{f_n}$ can be computed where $Enc_{pk}(c+f)$ is a fresh ciphertext by encrypting c+f, as well as $ct_{\lambda, c} = ct_\lambda \boxtimes ct_c$. All parties together execute Share($ct_{\lambda, c}$, $P_1$, ..., $P_n$), so that Party $P_i$, $1 \leq i \leq n$, holds a secret share $\gamma_i(c)$ of $\lambda c$. Eventually, Party i holds $(c_1, \gamma_i(c))$, so that $c = c_1 + \ldots + c_n$ and $\lambda c = \gamma_i(c) + \ldots + \gamma_n(c)$.

As is known in the art, generating triples requires performing public key operations (i.e., homomorphic addition and multiplication over ciphertext) and therefore the offline phase is time-consuming for large number of triples. Note that a beaver multiplication triple is one kind of tuple; several other tuples, such as inverse tuples ([x], [1/x]), also exist in protocol SPDZ for different purposes.

Figure 2:
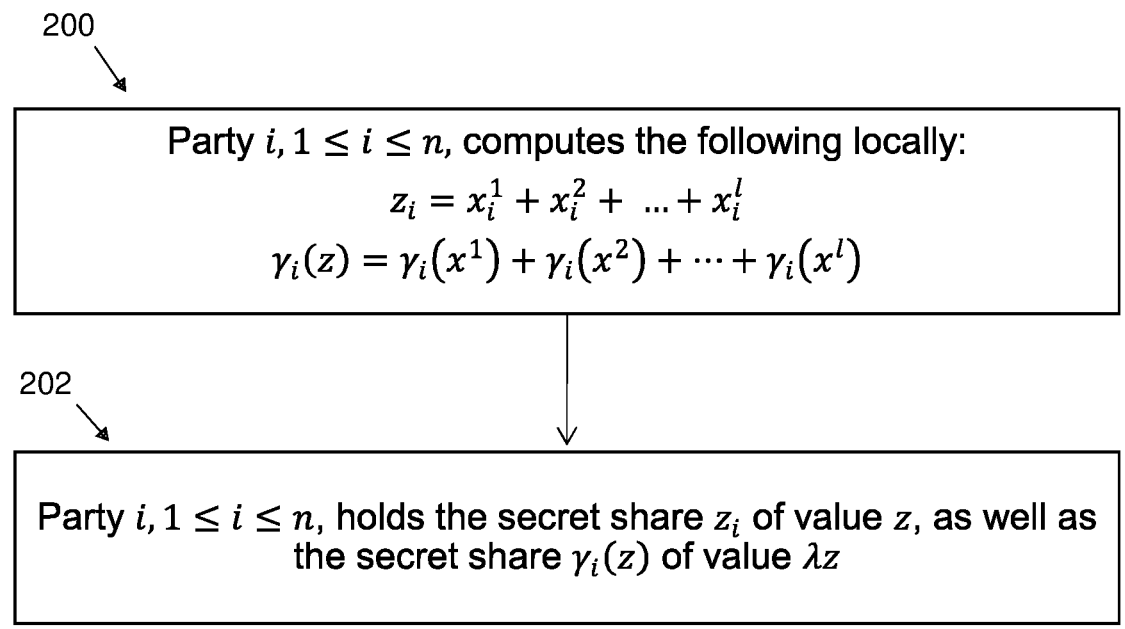
FIG. 2 depicts the steps of the SPDZ Protocol Add($[x^1]$, $[x^2], \ldots, [x^l]$), where $[x^j]$ is the share value $x^j$, $1 \leq j \leq l$.

Since any arithmetic circuit can be represented as a set of addition and multiplication gates, the online phase focuses on how to compute the addition and multiplication securely. A multiparty addition enables multiple parties to add different shares of l different values to generate a sum, and the multiparty addition also includes subtraction by negating the appropriate values to perform subtraction. An embodiment of the SPDZ Protocol Add is depicted in FIG. 2. In a simple example where l=2 the multiparty addition adds the shares of two numbers together, although a multiparty addition can add the shares of more than two numbers as well. The terms $[x^1]$, $[x^2]$, ..., $[x^l]$ represent shares of l different values $x^1$, $x^2$, ..., $x^l$, respectively, that are being added in the multiparty addition process. In the context of this document the superscript notation does not indicate a mathematical exponent. As described above, each share includes a tuple $(x_i, \gamma_i(x))$. During multiparty addition, each party computes a value $z_i$ based on a sum of the $x_i$ terms from all of the shares: $z_i = x_i^1 + x_i^2 + \ldots + x_i^l$ and a value $\gamma_i(z)$ based on a sum of the $\gamma_i(x)$ terms from all of the shares: $\gamma_i(z) = \gamma_i(x^1) + \gamma_i(x^2) + \ldots + \gamma_i(x^l)$. These operations enable each of the parties $P_i$, $1 \leq i \leq n$ to have a share $[z_i]$ of the total sum value z and the share $\gamma_i(z)$ of the MAC value $ct_\lambda z$ where each party holds the tuple $(z_i, \gamma_i(z))$. As noted above, each party has a share $[z_i]$ of the sum z, but each party does not have access to the actual sum value of z, which ensures that even in a two-party addition process that one party cannot determine the value held by the other party given the sum and the plaintext of one of the two values being added together.

In the multiparty addition described above, the computational complexity for each addition is $\mathcal{O}$ (1) for the l shares that are being added together, and the computations include comparatively simple addition operations without requiring the use of the public key pk for further encryption operations. Furthermore, after the shares $[x^1]$, $[x^2]$, ..., $[x^l]$ have been distributed to the parties, there is no further need for communication between parties or the use of a Beaver triple to compute the share of the sum $[z_i]$ for each party.

Figure 3:
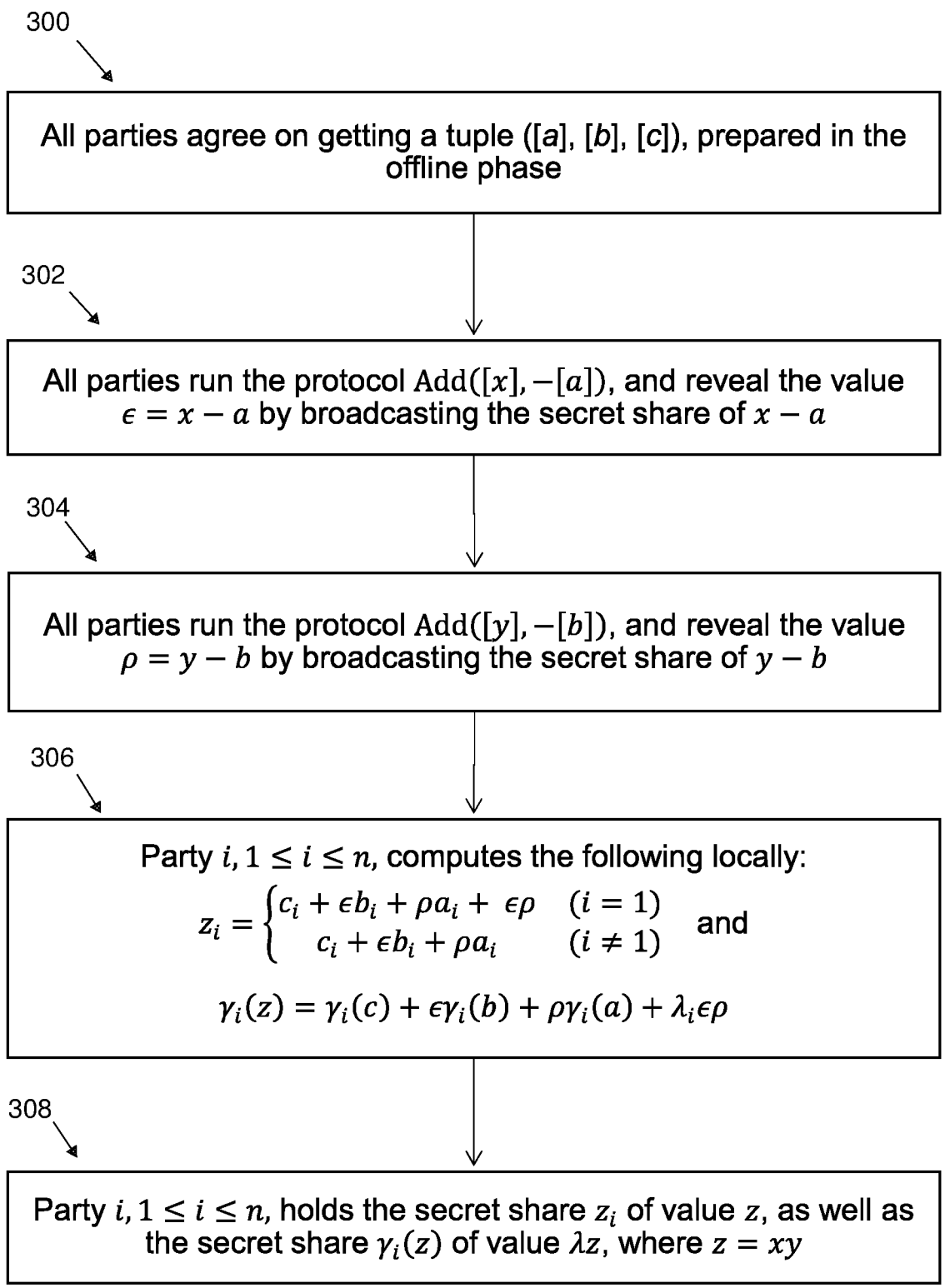
FIG. 3 depicts the step of the SPDZ Protocol Mult([x], [y]), where [x] is the share of value x and [y] is the share of value y.

A multiparty multiplication enables the parties that have shares [x] and [y] of two values x and y. Protocol Mult in FIG. 3 shows how to securely perform multiplication. Unlike the multiparty addition that can add together shares from more than two values, the multiparty multiplication is applied to exactly two values. The multiparty multiplication process uses a Beaver triple ([a], [b], [c]) that has been shared in an offline phase that is described below. During the multiparty multiplication process, each party $P_i$, $1 \leq i \leq n$ uses the addition process that is described above to add shares of the input [x] and a negated Beaver triple share value [a]: Add($[x_1]$, $-[a_i]$). Similarly, each party uses the addition process that is described above to add shares of the input [y] and a negated Beaver triple share value [b]: Add($[y_i]$, $-[b_i]$). Each party broadcasts the results of both additions described above to all of the other parties: $\in = x - a$ and $\rho = y - b$. As described above, because of additive homomorphism, the results $\in$ and $\rho$ reveal the total differences between the tuples of x and a and the tuples of y and b. The multiparty multiplication process continues using the $c_i$ value from each share [c] in the Beaver triple as each party generates two local values $z_i$ and $\gamma_i(z)$:

$$z_i = \begin{cases} c_i + \epsilon b_i + \rho a_i + \epsilon \rho & (i = 1) \\ c_i + \epsilon b_i + \rho a_i & (i \neq 1) \end{cases} \text{ and}$$

$$\gamma_i(z) = \gamma_i(c) + \epsilon \gamma_i(b) + \rho \gamma_i(a) + \lambda_i \epsilon \rho$$

The multiparty multiplication process enables each party to hold a share $[z_i]$ of the product of the original values x and y (z=xy) where once again $[z_i] = (z_i, \gamma_i(z))$. As with the multiparty addition process, even if there are only two parties that participate in a multiparty multiplication and each party is assumed to have access to one of the plaintext inputs x or y, the share $[z_i]$ from the multiplication process prevents either party from identifying the value that is held by the other party because the share $[z_i]$ does not reveal the true product value z. The multiparty multiplication process requires both communication between the parties to produce shared values $\in$ and $\rho$. Additionally, the multiplication process consumes the shares ([a], [b], [c]) of one Beaver triple, where each Beaver triple is only used once.

The secret sharing scheme in protocol SPDZ is the n out of n additive secret sharing scheme. According to the additive secret sharing scheme, given a secret value $\alpha$ and a set of parties $\{P_1, \ldots, P_n\}$, $\alpha_1, \ldots, \alpha_{n-1}$ uniform is chosen at random and $\alpha_n$ is selected such that it satisfies $\alpha_1 + \ldots + \alpha_n = \alpha$, where $\alpha_i$ is distributed to the party $P_i$. As a result, n parties (i.e., all parties) are required in order to recover the secret value $\alpha$.

In order to tolerate at most n−t unavailable parties, t available parties should be able to recover the secret shares held by those n−t unavailable parties. Based on this observation, protocol ReShare is proposed, where each party redistributes its holding secret share to any subset of t parties, and the protocol ReCombine, where t parties can recover the secret shares of the unavailable parties, and then reconstruct the secret value eventually if needed. Based on the two protocols, a secret share redistribution phase and a secret share recombination phase are proposed which can be placed between the offline and online phases of Protocol SPDZ, so that the resulting SPDZ protocol enjoys the fault tolerance property.

The secure protocol ReShare enables two or more nodes to generate shares of a value that is already known to all of the nodes (i.e. the full value is already "shared" by the nodes and this process "reshares" portions of the overall value) in which each node holds a share of the total value without knowing the share that is held by any other node. In the embodiments described herein, the reshare operation is defined as: Reshare ($ct_s$, $P_1$, . . . , $P_n$) where $ct_s$ is an encrypted ciphertext (ct) of a secret value s and $P_1$, . . . $P_n$ represent the n parties that participate in the resharing operation. The encrypted ciphertext value ct is known to all of the parties as a whole, and the resharing operation enables the parties to each receive a share of the original set of data without knowing the shares of the other nodes, even in a two-node system. The resharing operation begins with encryption of the secret value s using the public key pk to produce a ciphertext $ct_s = Enc_{pk}(s)$, and the ciphertext $ct_s$ is transmitted to all of the n parties in the group of parties that receive an encrypted share of the secret value s. Each party i in the n parties generates a uniformly random value $f_i \in F_p$ and uses the public key pk to encrypt the random value to generate a ciphertext of the random value: $ct_{f_i} = Enc_{pk}(f_i)$. Each party transmits the respective ciphertext value $ct_{f_i}$ to all of the other parties via a data network, and each party calculates a ciphertext sum $ct_{s+f}$ of the encrypted value of s and the individual encrypted values $ct_{f_i}$: $ct_{s+f} = c_s \boxplus ct_{f_1} \boxplus ct_{f_2} \boxplus \ldots \boxplus ct_{f_n}$ where once again the $\boxplus$ operator indicates addition of ciphertexts in a cryptographic system that provides additive homomorphism. The parties then perform a cooperative decryption process using the individual portions of the private key sk; to decrypt the value $ct_f$ to obtain the sum of s+f, where f is the sum of all the individual random values $f_i$. The final shares amongst the n parties are $[s_1] = s + f - f_1$ for party 1 and $[s_i] = -f_i$ for each of the other i parties.

The protocol ReShare is depicted in FIG. 4. The first loop redistributes the holding secret shares of each party to all available parties via authenticated confidential channels. The second loop sums the redistributed secret shares and stores the sums in association with the unique identifiers assigned to each party for each party. The aggregate operation here reduces the storage overhead. Note that the label string "Label" is used to uniquely identify the parties in the subset and the associated redistributed secret shares, and can facilitate reconstructing secret shares. It is worth noting that any secret share is redistributed to the subsets of t parties in the additive manner, therefore any t−1 parties (except the party holding that secret share) cannot recover the secret share. Given n parties, the number of the subsets having t parties is $(n|t)$; therefore, the number of subsets including one specific party is $((n|t))/n = ((n-1)|t)$ Hence, each party needs to store $((n-1)|t)$ redistributed secret shares and the respective labels.

Protocol ReCombine is depicted in FIG. 5. Protocol ReCombine enables t parties to use their holding secret shares and redistributed secret shares, to compute secret shares of the secret value. Each party $P_i$, $1 \le i \le n$ holds the secret share $\alpha_i$ and the set of redistributed secret shares $AggSet_i$.

An example will now be discussed to illustrate the protocol ReShare and ReCombine. Suppose there are four parties (i.e., n=4), holding the secret shares $x_1$, $x_2$, $x_3$ and $x_4$, respectively, such that $x = x_1 + x_2 + x_3 + x_4$ where x is the secret value. Suppose the system requires tolerating at most two unavailable parties (i.e., n−t=2) meanings that any t=2 parties should be able to reconstruct the secret value.

An example will now be discussed to illustrate the protocol ReShare and ReCombine. Suppose there are four parties (i.e., n=4), holding the secret shares $x_1$, $x_2$, $x_3$ and $x_4$, respectively, such that $x = x_1 + x_2 + x_3 + x_4$ where x is the secret value. Suppose the system requires tolerating at most two unavailable parties (i.e., n−t=2) meanings that any t=2 parties should be able to reconstruct the secret value.

FIG. 6 depicts a table that presents the intermediate results after party $P_1$ redistributes its holding secret share $x_1$ to other parties. Note that "Label" is the string concatenating all parties' indexes in order, and it can uniquely identify each subset of t parties. In the example, since t=2, the set of all subsets having 2 parties is $\{\{P_1, P_3\}, \{P_2, P_4\}, \{P_3, P_4\}\}$. The sum of redistributed shares in the same row is equal to the secret share $x_1$. For example, $x_{1,2,Label_{2,3}} + x_{1,3,Label_{2,3}} = x_{1,2,Label_{2,3}} + x_{1,4,Label_{2,4}} = x_1$ and $x_{1,3,Label_{3,4}} + x_{1,4,Label_{3,4}} = x_1$. FIG. 7 shows the final result after all parties redistribute their holding secret shares to the other parties.

FIG. 8 depicts the final result after executing the protocol ReShare. According to FIG. 8, each party holds three redistributed secret shares and the respective labels, as well as the holding secret share. Accordingly, any two parties in this case can construct the secret value. Suppose that parties $P_1$ and $P_2$ are online but parties $P_3$ and $P_4$ are unavailable. With the protocol ReCombine, parties $P_1$ and $P_2$ compute $x_1 + x_{3,1,Label_{1,2}} + x_{4,1,Label_{1,2}}$ and $x_2 + x_{3,2,Label_{1,2}} + x_{4,2,Label_{1,2}}$, respectively. We can see that these two locally computed values can recover the secret value x, because $x_{3,1,Label_{1,2}} + x_{3,2,Label_{1,2}} = x_3$, $x_{4,1,Label_{1,2}} + x_{4,2,Label_{1,2}} = x_4$ and $x_1 + x_2 + x_3 + x_4 = x$.

After executing the offline phase, two different kinds of data shares need to be redistributed: cryptographic key shares (i.e., private key shares and MAC key shares), and the tuple shares. For the cryptographic key shares, only the MAC key shares are considered because private key shares will not be used in the online phase. Note that for each tuple share, each element within the tuple held by the parties is in the form [x], consisting of the data secret share and MAC value share. Therefore, we only need to apply the protocol ReShare on the data secret share and MAC value share, respectively. FIG. 9 describes the secret share redistribution phase in which the MAC key shares and tuple shares which are generated in the offline phase are redistributed.

During the secret share recombination phase, shown in FIG. 10, Protocol ReCombine is applied to compute the MAC key share and tuple shares. Note that it is possible that there are more than t parties available, but only t parties need to be selected.

Figures 11, 12:
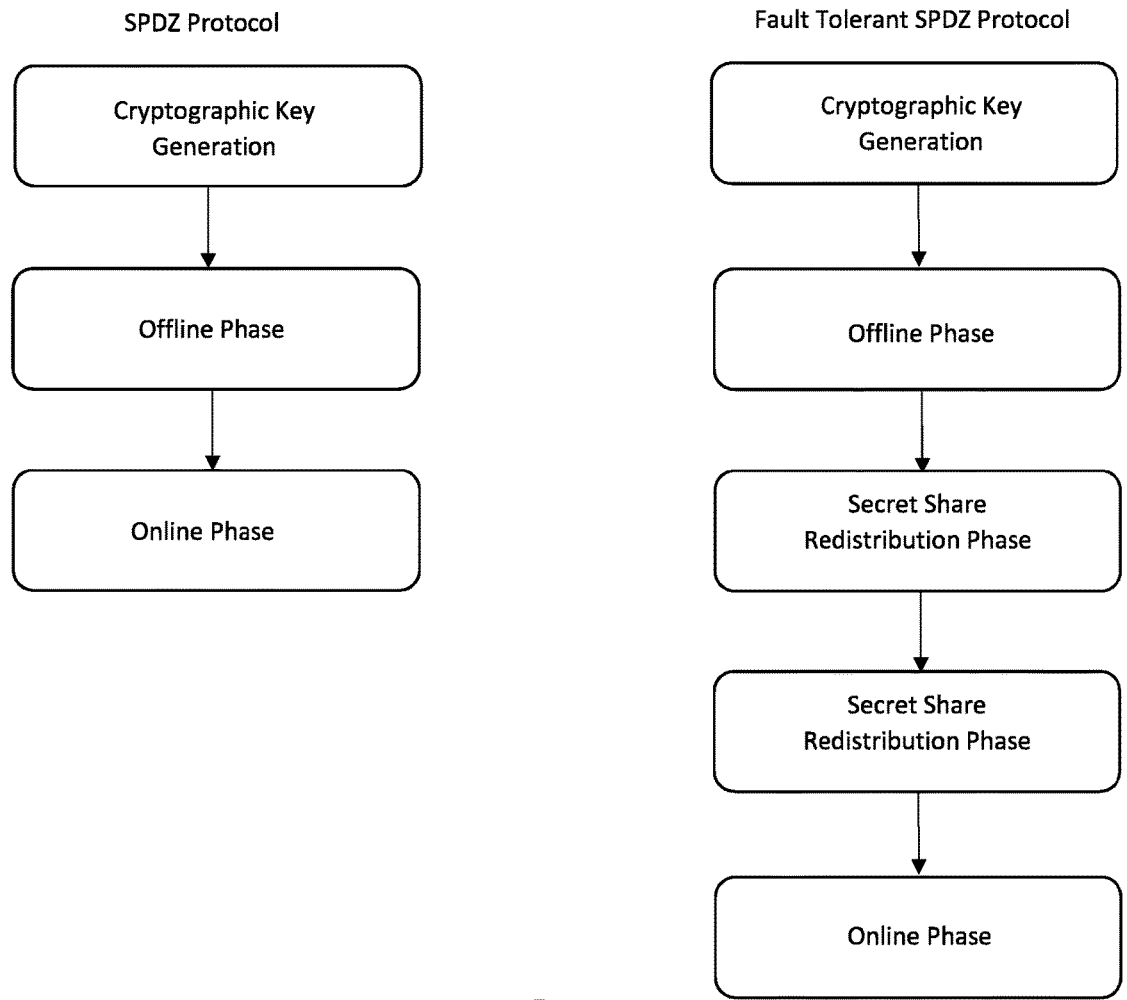
FIG. 11 schematically shows the SPDZ Protocol architecture versus the proposed Fault Tolerant SPDZ Protocol architecture.
FIG. 12 depicts a table showing a comparison of the SPDZ Protocol and the proposed Fault Tolerant SPDZ Protocol.

As depicted in FIG. 11, given the above two phases, the fault tolerant SPDZ can be built by incorporating the secret share redistribution phase and the secret share recombination phase discussed above between the off line and online phases. Note that before executing the secret share recombination phase, t parties need to be selected. Therefore, t parties need to be available.

Given the parameters n (i.e., the total number of parties) and t (i.e., the least number of available parties), the following metrics are considered to compare the SPDZ protocol with the fault tolerant SPDZ protocol:

Storage consumption: the storage consumption each party spends on storing a secret value.

Number of malicious parties: the number of malicious parties that are allowed to be present in order to assure the security of the protocol.

Fault tolerance: the number of available parties that are allowed to be present in order to assure the correctness of the protocol.

FIG. 12 shows the comparison between the two protocols. As can be seen, the fault tolerant feature for the Fault Tolerant SPDZ (i.e., n−t vs. 0 for SPDZ) is achieved at the price of increasing the storage consumption (i.e., $\binom{n-1}{t}+1$ vs. n−1 for SPDZ) and decreasing the number of malicious parties allowed in the protocol (i.e., t−1 vs. n−1 for SPDZ). The value n−t should be chosen properly because the storage consumption is almost exponential to the value.

In the above section, it is assumed that participating parties not only perform the offline and online phases, but also provide their private inputs to the computation. The fault tolerant SPDZ scheme described above may also be implemented as a service where multiple service providers host many dedicated servers that are responsible for performing the offline and online phases, and end users upload their private inputs in the form of secret shares ad store them in multiple dedicated servers. Note that the stored input secret shares in the dedicated servers are also in the form of $[x]=\{(x_1, \gamma_1(x)), \ldots, (x_n, \gamma_n(x))\}$, where party $P_1$, $1 \leq i \leq n$, holds the tuple $(x_1, \gamma_1(x))$, such that $x=x_1+ \ldots +x_n$ and $\lambda x=\gamma_1(x)+ \ldots +\gamma_n(x)$, and $\lambda$ is the MAC key. Therefore, it s still valid to apply protocol ReShare and ReCombine on private input shares in the secret share redistribution and secret share recombination phases, so that the extended SPDZ protocol enjoys the fault tolerance under this model.

Figure 13:
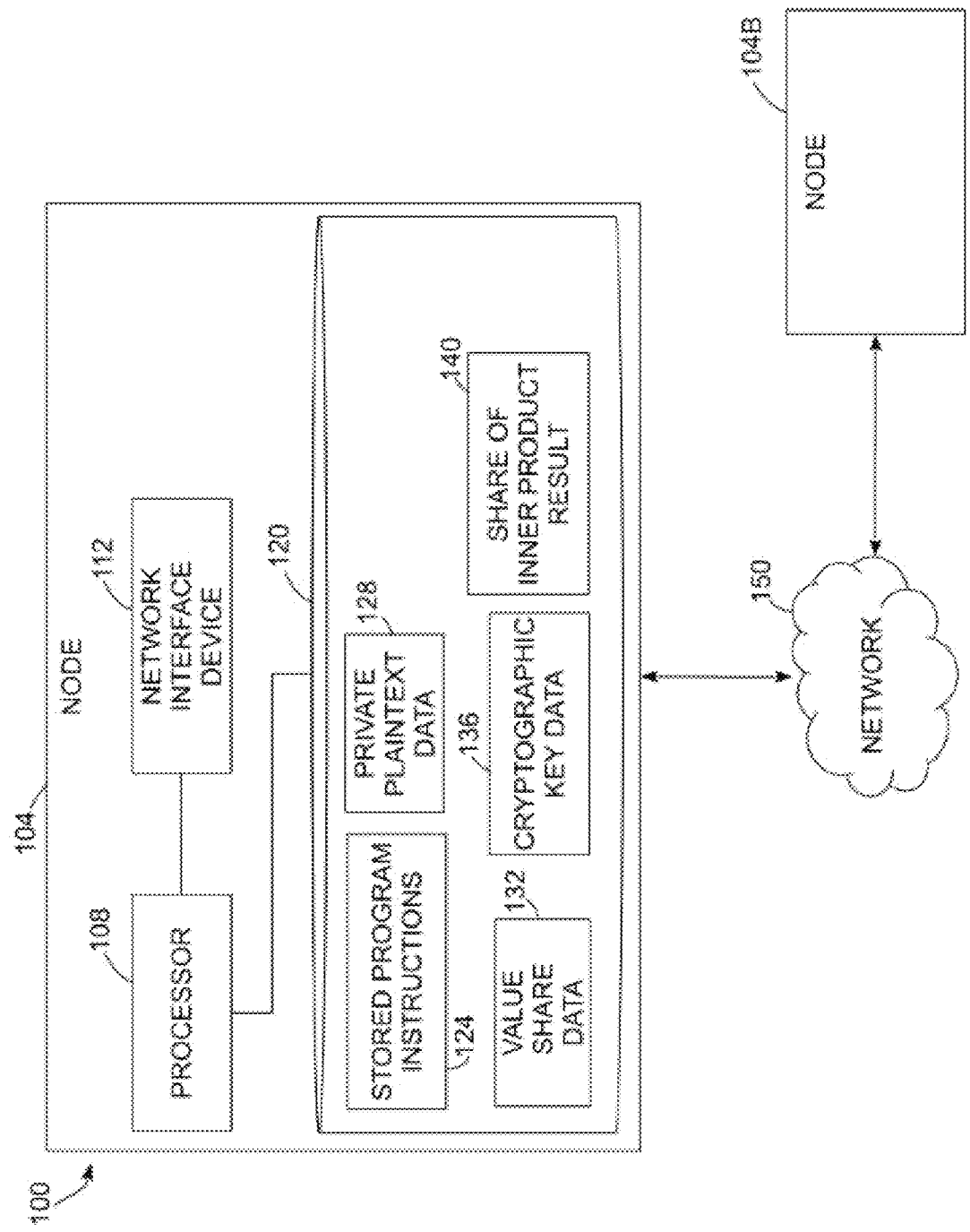
FIG. 13 is a schematic diagram of a system that is configured to perform secure multiparty computation using SPDZ in accordance with the disclosure.

FIG. 13 depicts an exemplary system 100 for performing multiparty computation (MPC) protocols using the extended SPDZ protocols described above. The system includes a plurality of computer nodes 104A and 104B that are communicatively connected to each other via a data network 150. In the system 100, each of the nodes 104A and 104B is a party in the SPDZ processes described herein. Each node is a computing device that acts as a single party in the secure multiparty computations processes that are described herein, and the term "node" is used interchangeably with the term "party" in the embodiments described below. FIG. 13 depicts the node 104A in detail, and the node 104B is configured in a similar manner with different sets of stored data to implement a secure multiparty inner product computation using the embodiments described herein. While FIG. 13 depicts a system with two nodes 104A-104B for illustrative purposes, the embodiments described herein can be performed by groups of three or more nodes as well.

Referring to node 104A in more detail, the node includes a processor 108 that is operatively connected to a network interface device 112 and a memory 120. The processor 108 is typically a central processing unit (CPU) with one or more processing cores that execute stored program instructions 124 in the memory 120 to implement the embodiments described herein. However, other embodiments of the processor 108 use different processing elements instead of, or in addition to, a CPU including graphics processing units (GPUs), field programmable gate arrays (FPGAs), application specific integrated circuits (ASICs), digital signal processors (DSPs), and any other digital logic device that is configured to perform the operations described herein. In some embodiments, the processor 108 implements a hardware random number generator (RNG) or uses a software random number generator or pseudo-random number generator (PRNG) to generate the random values. In the description herein, any reference to the generation of a random value or use of a random value refers to the operation of an RNG or PRNG to generate a value in a uniformly random manner selected from a predetermined numeric range (e.g. the finite field $F_p$).

The network interface device 112 connects the node 104A to a data network 150, such as a local area network (LAN) or wide area network (WAN) to enable communication between the node 104A and the node 104B of FIG. 13, and to additional nodes that perform the secure multiparty inner product computation processes described herein. Non-limiting embodiments of the network interface device 112 include a wired network devices such as an Ethernet adapter or wireless network devices such as a wireless LAN or wireless WAN network adapter. In the system 100, all transmissions of data that are made through the network 150 are assumed to be observed by third party adversaries (not shown in FIG. 13) that can record all data transmitted from the nodes 104A and 104B, although the nodes 104A and 104B may communicate using a transport layer security (TLS) encrypted and authenticated channel or other equivalent communication channel that prevents eavesdroppers from observing or altering communications via the network 150. The embodiments described herein prevent an adversary that can observe communication between the nodes 104A and 104B from determining the value of any private data in addition to preventing the node 104B from identifying the private plaintext data 128 of the node 104A and vice versa during multiparty inner product computations.

The memory 120 includes one or more volatile memory devices such as random access memory (RAM) and non-volatile memory devices such as magnetic disk or solid state memory devices that store the program instructions 124, private plaintext data 128, value share data 132, cryptographic key data 163, and the computed result of the inner produce 140. The private plaintext data 128 include all or a portion of one vector in two vectors that form the inputs to the inner product computation. The two vectors in the plaintext data 128 are referred to as x and wherein. The value share data 132 include the share that each node receives during the operation of the system 100 including shares of Beaver triple values that are generated during an offline phase and shares of values that are exchanged during the inner product calculation process. As described above, each share provides an encrypted version of a portion of each value to each node. The cryptographic key data 136 include a share of the encrypted MAC cryptographic key for the node 104A, the public key pk, and the share of the private key sk; that is shared with the node 104A. The computed result of the inner product 140 is the final output of the multiparty computation of the inner product value.

The node 104B includes a memory with similar data structures except that the node 104B stores a different set of private plaintext data 128 corresponding to the second vector used to generate the inner product, different sets of secret value shares 132, and different shares of the private key and MAC key in the cryptographic key data 136. As described below, both nodes 104A and 104B compute the same result of the inner product 140. In the illustrative embodiment of FIG. 13, the node 104A stores all of the plaintext elements of the vector x and the node 104B stores all of the plaintext elements of the vector w, but in other embodiments the plaintext data for either or both of the vectors is distributed to multiple nodes to enable a larger number of nodes to perform secure multiparty inner product calculations.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A method for implementing a secure multiparty computation protocol between a plurality of parties for a multiparty computation, the multiparty computation defining a function to be computed, each of the parties including a private input for the function, the method comprising:

performing an offline phase of an SPDZ protocol for each of the parties participating in the multiparty computation during which random multiplication triples are generated which define secret shares for the parties, the secret shares being combinable to form a cryptographic key;

performing a secret share redistribution phase after the offline phase wherein the secret shares of all the parties are redistributed to each party in a subset of the parties;

performing a secret share recombination phase after the secret share redistribution phase during which the subset of the parties recombines the redistributed secret shares to recover the secret shares of the parties not in the subset; and performing an online phase of the SPDZ protocol during which the function is computed with respect to the private inputs of the parties and using the secret shares of the parties in the subset of parties and the secret shares of the parties not in the subset recovered during the secret share recombination phase.

2. The method of claim 1, wherein the multiplication triples are Beaver multiplication triples.

3. The method of claim 1, wherein the function to be computed is addition.

4. The method of claim 1, wherein the function to be computed is multiplication.

5. The method of claim 1, wherein the secret shares are additive to correspond to the cryptographic key.

6. The method of claim 1, wherein the offline and online protocols are performed locally at each of the parties, respectively.

7. The method of claim 1, wherein the offline and online protocols are performed remotely for at least one of the parties.

8. A computer system for participating in a multiparty computation, the computer system including:

a processor configured to execute programmed instructions; and a memory for storing the programmed instructions, wherein the programmed instructions include instructions which, when executed by the processor, enable the computer system to implement a secure multiparty computation protocol for a multiparty computation, the multiparty computation defining a function to be computed, the secure multiparty computation protocol comprising:

performing an offline phase of an SPDZ protocol for each of the parties participating in the multiparty computation during which random multiplication triples are generated which define secret shares for the parties, the secret shares being combinable to form a cryptographic key;

performing a secret share redistribution phase after the offline phase wherein the secret shares of all the parties are redistributed to each party in a subset of the parties;

performing a secret share recombination phase after the secret share redistribution phase during which the subset of the parties recombines the redistributed secret shares to recover the secret shares of the parties not in the subset; and performing an online phase of the SPDZ protocol during which the function is computed with respect to the private inputs of the parties and using the secret shares of the parties in the subset of parties and the secret shares of the parties not in the subset recovered during the secret share recombination phase.

9. The system of claim 8, wherein the multiplication triples are Beaver multiplication triples.

10. The system of claim 8, wherein the function to be computed is addition.

11. The system of claim 8, wherein the function to be computed is multiplication.

12. The system of claim 8, wherein the secret shares are additive to correspond to the cryptographic key.

13. The system of claim 8, wherein the offline and online protocols are performed locally at each of the parties, respectively.

14. The system of claim 8, wherein the offline and online protocols are performed remotely for at least one of the parties.

* * * * *